Figure 1:
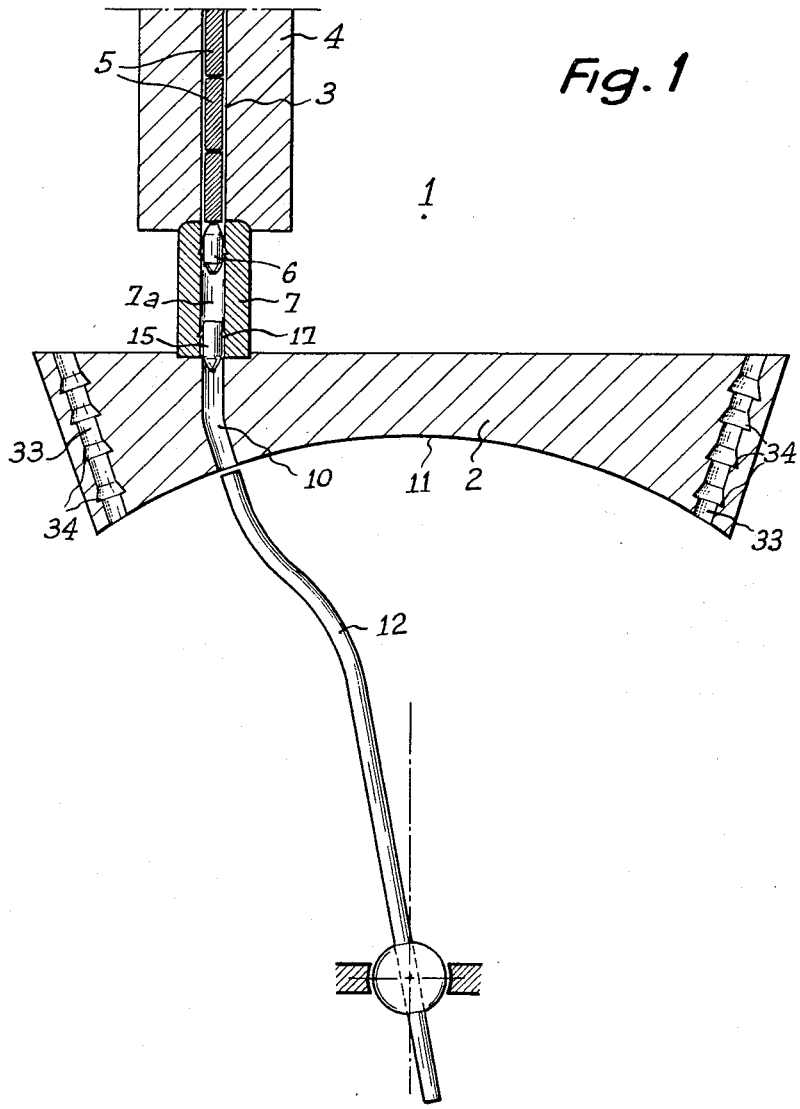

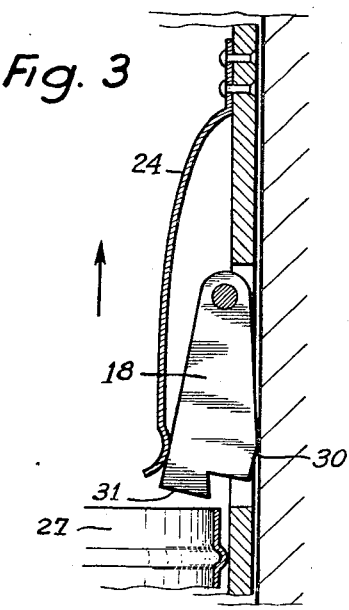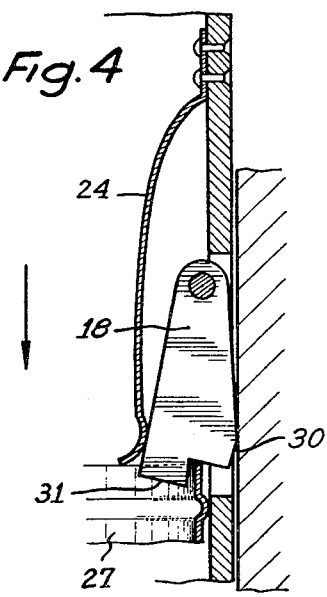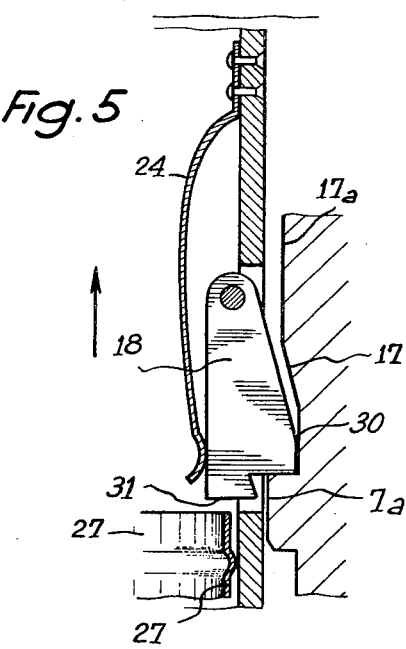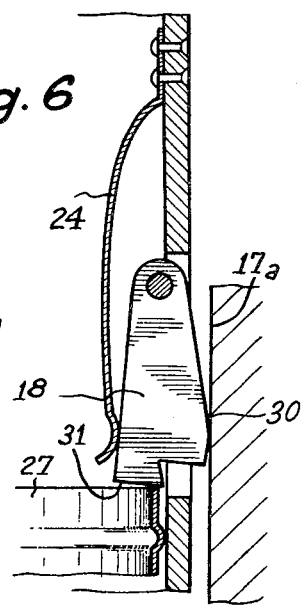

United States Patent Office 3,110,655
Patented Nov. 12, 1963

3,110,655
APPARATUS FOR INDIVIDUALLY ADJUSTING THE REGULATION OF THE COOLING FLUID FLOW IN THE CHANNELS OF A NUCLEAR REACTOR
Roger Martin, Paris, France, assignor to Commissariat a l'Energie Atomique, Paris, France
Filed Jan. 14, 1959, Ser. No. 786,865
Claims priority, application France Jan. 20, 1958
3 Claims. (Cl. 204—193.2)

The present invention relates to nuclear fission reactors in which cooling is effected by circulation of a fluid in the channels in which the fuel elements are accommodated.

It is known that the satisfactory operation of a reactor of this type calls for absolutely accurate regulation, for each channel, of the flow of cooling fluid circulating therein. Actually, if this flow is too small in one of the channels, the fuel elements in this channel heat up abnormally and serious trouble such as localized fires, cracking of the sheaths surrounding the fuel elements and liberation of very dangerous fission products, and so on, may occur. On the other hand, if the flow of fluid is too great the thermodynamic efficiency of the cooling system is small and this results in a reduction of the efficiency of the whole system.

Moreover, it is also necessary to provide for each channel an adjustment in time of the regulation of the flow of cooling fluid, since a modification of the curve representing the neutronic flux at different points in the reactor, due to the fact that fission products arise in greater quantities in the center of the pile, is observed during the operation of the reactor.

Furthermore, since the channels of an atomic reactor do not all operate under the same thermal and nuclear conditions, and since in any case the reactor as a whole is heterogeneous, there are differences in the variations of the physical properties of each channel (thermal expansions, Wigner growths, deformations of the fuel cartridges or slugs, and so on), which give rise to unforeseeable modifications of output which have to be dealt with.

Lastly, it is to be observed that it is practically impossible to imagine or devise an automatic or remote control of these necessary individual regulations, since the atomic reactors now used generally comprise some thousands of channels, and the number of orifices made in the casing surrounding the reactor is much smaller than the number of channels. Actually, this casing has to be provided with a minimum number of orifices, of which the diameter is as small as possible, in order as far as possible to satisfy the conditions imposed on the one hand by the strength of the materials and on the other hand by sealing.

At present, in nuclear reactors with channels, there is generally a member called a "culasse" or stopper at at least one of the ends of each channel. The object of this stopper is to ensure the longitudinal positioning, and in the case of vertical channels the support, of the fissionable material elements or "cartridges," and the stopper must also permit the flow of cooling fluid.

One known solution of the problem of regulation of the cooling liquid flow in these reactors consists in using each stopper as a member for throttling the flow by providing passages of given cross-sectional area at the level of the stopper. But one serious disadvantage of this solution is that in order to adjust the regulation of flow in a channel it is necessary to detach the stopper and therefore, in the case of vertical channels, to clear the channel of its cartridges or slugs.

The present invention relates to an apparatus for individually adjusting the regulation of the cooling fluid flow in the channels of a nuclear reactor, which deals with the above-mentioned disadvantages and permits the regulation of the flow in any channel whatsoever to be adjusted very easily.

This apparatus for individual adjusting the regulation of the cooling fluid flow in the channels of a nuclear reactor surrounded by an enclosure, said channels including fissile material elements and each communicating with the regulating channels equipped with regulating devices providing a predetermined passage cross-section for the cooling fluid, is characterized in that the said regulating devices are mounted removably in the said regulating channels with the aid of securing means adapted to be remote-controlled, of any suitable type known per se, and that storage spaces are provided within the abovementioned enclosure identical in shape to those parts of said regulating channels in which are secured said regulating devices, and that regulating devices having the same particular predetermined passage cross-section are all stored in one of the storage spaces, and that transfer means known per se are also provided within the said enclosure for transferring a regulating device from any one of the regulating channels to any one of the aforesaid storage spaces, or vice versa.

Figure 2:
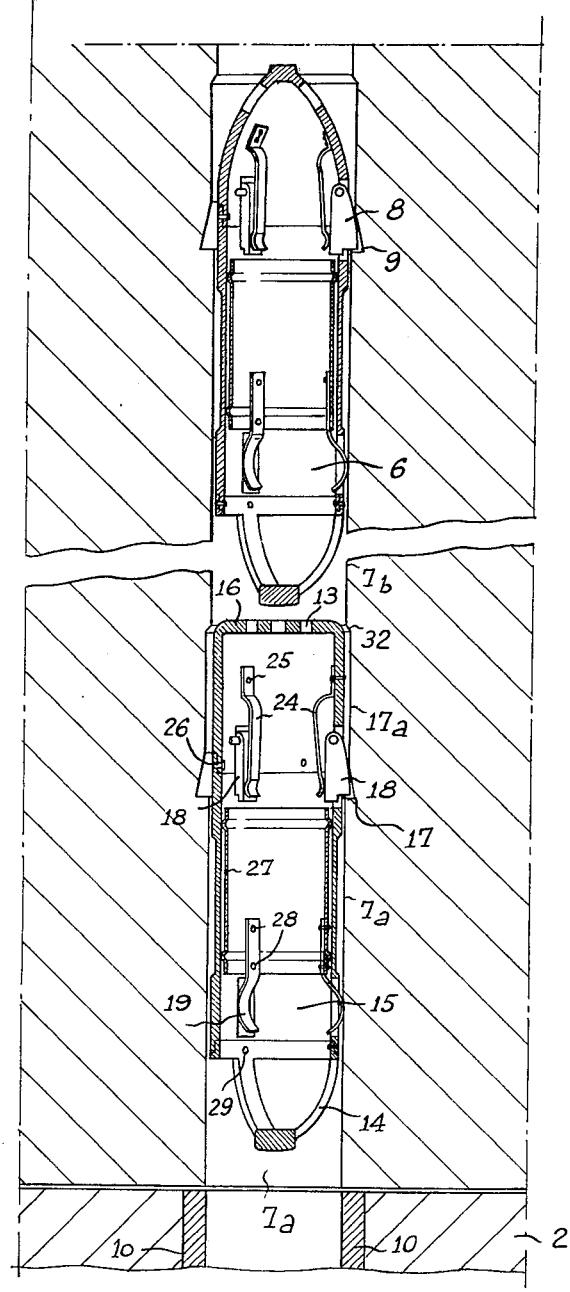

One embodiment of an apparatus for regulating the flow of cooling fluid in a channel of a nuclear reactor, to which the invention relates, has been chosen by way of example and is described hereunder with reference to the accompanying drawings, in which:

FIGURE 1 is a diagrammatic vertical section through the lower part of a nuclear reactor equipped with apparatus constructed in accordance with the invention, FIGURE 2 is a vertical diagrammatic section, on a larger scale, through the end of the channel of the reactor, showing a regulating device constructed in accordance with the invention, FIGURES 3, 4, 5 and 6 are vertical diagrammatic sections showing a way of setting this regulating device in place and of extracting the device.

FIGURE 1 shows the lower part of a reactor with for instance vertical channels which are charged and cleared from below with the aid of any suitable known system.

The active part 1 of the reactor is supported by a rigid base 2 comprising a block number. Each vertical channel 3 made in a moderating material 4 which is generally graphite, contains cartridges or slugs 5 of fissionable material. These cartridges 5 are supported, in each channel, by a retaining stopper 6.

Each retaining stopper 6, of a type known per se, is secured in a metal member 7 which is situated between the moderator 4 and the base 2 and comprises a channel 7a in prolongation of each channel 3.

The stopper 6 is secured in the member 7 for instance by means of retractable fingers 8 pivoted to the stopper 6 and entering throats or recesses 9 in the member 7.

FIGURE 1 shows that the channel 3 and the channel 7a are continued downwards by a bent channel 10 opening into a spherically curved depression 11 in the bottom of the base 2. A hollow collecting tube 12 of which the angular position is controlled by any suitable known device, not shown in the drawing, permits access to the end of each channel 10 for charging or clearing.

The regulating device constructed in accordance with the invention and shown in detail in FIGURE 2 comprises a metal cylindrical body or ferrule 15 provided at its end with a handling tip 14 through which cooling liquid can pass freely; an upper tip 16 of the ferrule 15 is provided with orifices 13 with predetermined cross-sections.

In accordance with the invention, the regulating device is removable; for this purpose, the device is provided with retractable engaging fingers 18 similar to the fingers 8 of the retaining stopper 6. These fingers 18 engage in throats or recesses 17 similar to the throats or recesses 9 for securing the stopper 6.

Three springs such as 24 attached to the tip 16 by rivets 25 urge the fingers 18 outwards. The tip 16 is attached to the ferrule 15 by rivets such as 26.

A sleeve 27 is mounted slidably within the ferrule 15. Three regularly spaced springs 19 are fixed to the inside of this sleeve 27 by rivets 28. The shape of these springs 19 is such that when the sleeve 27 is inside the ferrule 15 the springs 19 project outwards through longitudinal slots in the ferrule 15, and that the bottom ends of the springs bear against the bottom tip 14 when the sleeve is pushed downwards, as described hereinafter.

The tip 14 is attached to the bottom part of the ferrule 15 by rivets 29.

When the regulating device is placed in the circulation channel 10, or the tube 7a forming a prolongation of the channel 10 into the member 7, and when the tip 16 carrying the engaging fingers 18 has entered the tube first, a reciprocating backward and forward movement causes similar relative movement of the sleve 27, Thus, this sleeve 27 alternately locks the engaging fingers 18 in their withdrawn position and releases them, as shown in FIGURES 3 and 4.

Actually, under the action of friction the springs 19 bear against the inner wall of the circulation channel 10 or tube 7a and cause a delay in the longitudinal displacement of the sleeve 27 as compared with the ferrule 15, in either direction of displacement of the regulating device. Therefore, during all forward movements of the regulating device (FIGURE 3) the engaging fingers 18 are left free to move apart, and during withdrawal movements the fingers are prevented from moving apart when there is an increase in the diameter along this path (connection or expansion joints, operative clearance, blocking members and so forth).

FIGURE 5 shows that in order to attach the regulating device, this device is moved into the channel 10 and then into the tube 7a by means of an actuating member such as a piston for instance. The engaging fingers 18 urged by the springs 24 rub against the wall of the channel 10 and then against the wall of the tube 7a, as do also the springs 19 of the sleeve 27 which abut against the bottom tip 14.

When the engaging face 30 of the fingers 18 reaches a position level with a recess such as 17, the fingers 18 move apart. If the direction of displacement is reversed, the regulating device remains suspended by its engaging fingers 18 and the actuating member moves back alone.

Under these circumstances, correct operation requires a relatively precise upwards movement to be sure that the lower edge of the fingers 18 comes above the lower edge of the recess 17 (FIG. 5). To make less critical the precision of this upwards movement, a bore 17a (FIGS. 2 and 5) is provided on the upper side of the recess 17 and has a diameter intetrmediate between that of the tube 7a and that of the recess 17, such that the engaging fingers 18 cannot be locked by the sleeve 27 when the stopper is moved back. The extent of movement of the fingers 18 in this bore 17a of intermediate diameter is shown in FIG. 6.

The "guard" movement thus provided may be considerable; moreover, this movement is only limited by the length of the regulating device, since if the whole of this device were to enter the bore 17a, the fingers 18 could not be locked in the withdrawn position; actually, during withdrawal the top of the sleeve 27 would come into contact with the heel 31 of the finger 18 furthest out, and the springs 19 would be unstressed and would not rub against the wall of the bore 17a.

In order to extract the regulating device, the actuating member (a piston for instance) is brought up to this device, as can be seen in FIGS. 3 and 4. When the piston comes into contact with the device, the piston first moves the device upwards; the engaging fingers 18 follow the profile of the bore 17a and the chamfer 32 (FIG. 2) and enter the next bore 7b, of the same diameter as the bore 7a, and the fingers 18 are therefore withdrawn. The springs 19 rub against the bore 7a. During withdrawal, the sleeve 27 locks the fingers 18 in the withdrawn position, and this permits the fingers 18 to pass in front of the recess 17 without engaging.

Lastly, in accordance with the invention, chambers which serve as storage spaces for exchangeable regulating devices are provided inside the reactor (FIGURE 1), in the base 2. These storage spaces consist of channels 33 situated preferably in the peripheral portion of the base 2 and opening into the spherically curved depression 11 so as to be accessible by way of the collecting tube 12.

These storage spaces are provided, over the whole of their length, with recesses, such as 34, identical with the recesses 17 used for securing the regulating devices in the members 7.

The regulating apparatus to which the invention relates is used in the following manner:

After the reactor has been charged with nuclear fuel with the aid of the angularly displaceable tube 12, and the retaining stoppers 6 have then been set in place at the bottom of each channel 3, the tube 12 is brought into position in front of the storage space containing regulating devices of the required calibre, that is to say devices in which the passage cross section of the orifices corresponds to the required flow of cooling fluid.

After one of these devices has been disengaged from the storage space in which it was located, the tube 12 is aligned with the member 7 situated at the base of the required channel 3, and the regulating device is then introduced in this member 7 and secured by the opening of the engaging fingers 18.

If during the operation of the pile it is found that the flow of fluid in a channel is incorrectly regulated (excessively low or excessively high temperature of this channel), or that this flow needs to be modified for any reason whatsoever, the power of the pile is reduced, and then the regulating device which is in place in the channel in question is disengaged with the aid of the tube 12. This device is placed in the storage space 33 containing devices of the same calibre, and then a device of different calibre is disengaged from another storage space and is engaged at the base of the channel of which the regulation needs to be adjusted.

This operation is therefore extremely simple, and does not call either for clearing the cartridges out of the channel, or even complete stoppage of the pile: on the contrary, it is almost essential that the pile should operate, in order to enable the changes made in the flow to be observed at once. In practice, it is only necessary to reduce the power sufficiently, for instance by 50%, in order to prevent the channel from heating up dangerously during certain phases of the operation during which the flow of fluid in this channel is disturbed, either because of the presence of the tube 12 in the prolongation of the channel, or because of some error, which is always possible, regarding the calibre of the new regulating device which has been set in place.

I claim:

1. In a nuclear reactor, means defining a plurality of channels for the flow of cooling fluid within said reactor, said means including a block member disposed within said reactor and having openings in one surface thereof to provide access to corresponding ends of the respective channels, a plurality of flow-controlling plug elements having different flow capacities, means for releasably securing selected individual plug elements in selected channels, means defining storage areas within said reactor, said storage areas having access openings which are directed in substantially the same direction as said channel openings, and a collecting tube disposed in said reactor below said block member for retracting individual plug elements from selected ones of said openings, said collecting tube being mounted for controlled movement to transfer said individual plug elements to other selected ones of said openings and inserting said individual plug elements into said last-mentioned openings to thereby permit adjustment of the flow capacities of selected channels.

2. The apparatus of claim 1 wherein said block member is positioned below the active zone of the reactor, said storage area openings and said channel openings being provided on the undersurface of said block member.

3. The apparatus of claim 2 wherein said surface is spherically curved and downwardly concave, said transferring means comprising an arm pivotally mounted at one end thereof at the center of curvature of said spherically curved surface, the other end of said arm terminating adjacent said surface in all positions of pivotal movement for engagement with selected block elements.

References Cited in the file of this patent

UNITED STATES PATENTS

| | | |
|---|---|---|
| 2,780,596 | Anderson | Feb. 5, 1957 |
| 2,782,158 | Wheeler | Feb. 19, 1957 |
| 2,807,580 | Fenning et al. | Sept. 24, 1957 |
| 2,831,807 | McGarry | Apr. 22, 1958 |
| 2,841,545 | Zinn | July 1, 1958 |
| 2,861,034 | Wigner et al. | Nov. 18, 1958 |
| 2,868,706 | Untermeyer | Jan. 13, 1959 |
| 2,877,170 | Greenhalgh et al. | Mar. 10, 1959 |
| 2,890,158 | Ohlinger et al. | June 9, 1959 |
| 2,910,416 | Daniels | Oct. 27, 1959 |
| 3,009,868 | Moulin | Nov. 21, 1961 |

FOREIGN PATENTS

| | | |
|---|---|---|
| 565,885 | Belgium | Apr. 15, 1958 |

OTHER REFERENCES

Nucleonics, vol. 13, No. 6, June 1955, p. 52.